United States Patent [19]

Bung et al.

[11] Patent Number: 4,654,396
[45] Date of Patent: Mar. 31, 1987

[54] HIGHLY DILATANT POLYMER DISPERSIONS WITH REDUCED TEMPERATURE DEPENDENCE OF THE CRITICAL SHEARING RATE

[75] Inventors: Richard Bung; Klaus Haas; Martin Laun, all of Ludwigshafen; Franz Schmidt; Gerhard Welzel, both of Mannheim, all of Fed. Rep. of Germany

[73] Assignee: BASF Aktiengesellschaft, Ludwigshafen, Fed. Rep. of Germany

[21] Appl. No.: 773,664

[22] Filed: Sep. 9, 1985

[30] Foreign Application Priority Data

Sep. 8, 1984 [DE] Fed. Rep. of Germany ....... 3433085

[51] Int. Cl.$^4$ .......................... C08K 3/10; C08K 3/20; C08K 3/26; C08K 3/22
[52] U.S. Cl. ................................... 524/401; 524/423; 524/424; 524/425; 524/432; 524/433; 524/436; 524/437; 524/556; 524/557; 524/559
[58] Field of Search ............... 524/401, 424, 425, 432, 524/433, 436, 437, 555, 556, 557, 423, 559

[56] References Cited

U.S. PATENT DOCUMENTS

| 3,728,295 | 4/1973 | Skinner | 524/833 |
| 3,985,698 | 10/1976 | Matsudaira | 524/501 |
| 4,085,236 | 4/1978 | Ishibashi et al. | 524/552 |
| 4,165,418 | 8/1979 | Speakman | 525/377 |
| 4,371,636 | 2/1983 | Distler et al. | 524/833 |
| 4,388,438 | 6/1983 | Knypl et al. | 524/833 |
| 4,400,441 | 8/1983 | Minnis et al. | 524/555 |
| 4,403,059 | 9/1983 | Laut et al. | 524/556 |
| 4,536,539 | 8/1985 | Lundberg et al. | 524/832 |

OTHER PUBLICATIONS

Derwent Abs., 48269W/29, J49109415(10-1974).

Primary Examiner—Herbert J. Lilling
Attorney, Agent, or Firm—Oblon, Fisher, Spivak, McClelland, & Maier

[57] ABSTRACT

A dispersion, having highly dilatant flow, of a carboxyl-containing copolymer of monoolefinically unsaturated monomers, wherein the temperature dependence of the critical shearing rate is greatly reduced by incorporation of from 0.1 to 30% by weight of oxides, hydroxides, carbonates and/or water soluble salts of monovalent or divalent metals.

2 Claims, No Drawings

HIGHLY DILATANT POLYMER DISPERSIONS WITH REDUCED TEMPERATURE DEPENDENCE OF THE CRITICAL SHEARING RATE

U.S. Pat. No. 4,371,636 has disclosed a process for the preparation of copolymer dispersions having highly dilatant flow. In this process, $\alpha,\beta$-monoolefinically unsaturated monocarboxylic acids and/or dicarboxylic acids are copolymerized with other monoolefinically unsaturated monomers, with or without small amounts of polyolefinically unsaturated monomeric compounds, in the presence of conventional emulsifiers, dispersants and polymerization initiators, with or without regulators, in aqueous emulsion under simultaneous agglomeration with only partial amalgamation of the initially formed polymer particles, which have a diameter of from 5 to 200 nm, at a temperature near the glass transition temperature of the copolymer formed and thereafter (a) the copolymer content of the resulting aqueous copolymer dispersion is adjusted to 35–55% by weight and the pH to 3–5, unless these values already prevail, or (b) the water contained in the aqueous copolymer dispersion formed is replaced wholly or partially by a water-miscible solvent which does not dissolve or swell the copolymer. Examples of possible solvents of this type are formamide, ethylglycol, ethylene glycol, diethylene glycol, triethylene glycol, glyerol, propylene glycols and, if desired, tetrahydric to hexahydric saturated alcohols or mixtures thereof. Ethylene glycol, diethylene glycol, glycerol and formamide are of particular interest.

As $\alpha,\beta$-monoolefinically unsaturated carboxylic acids, such copolymers mostly contain acrylic acid and/or methacrylic acid, as well as maleic acid, itaconic or fumaric acid, ie. monoolefinically unsaturated carboxylic acids, in general of 3 to 5 carbon atoms, and also, where appropriate, monoesters of such dicarboxylic acids with alkanols, mostly of 1 to 4 carbon atoms, eg. monomethyl maleate, monomethyl fumarate or n-butyl itaconate, as copolymerized units, in amounts of, preferably, from 1 to 10% by weight. Monoolefinically unsaturated monomers which in general are present as the principal copolymerized units in the copolymers are especially those which give water-insoluble homopolymers, in particular monoolefinically unsaturated carboxylic acid esters of 1 to 14 carbon atoms, especially esters of acrylic acid and methacrylic acid with alkanols of 1 to 10, especially 1 to 4, carbon atoms, and vinyl esters of straight-chain or branched aliphatic carboxylic acids, generally of 2 to 12 carbon atoms. Examples of such olefinically unsaturated esters are, in particular, esters of methanol, ethanol, n-butanol, iso-butanol and 2-ethylhexanol with acrylic acid and methacrylic acid, in particular ethyl acrylate, ethyl methacrylate, n-butyl acrylate, n-butyl methacrylate and methyl methacrylate. Suitable vinyl esters are especially vinyl acetate, vinyl propionate and vinyl n-butyrate. Styrene is also of great interest as a monoolefinically unsaturated monomer. Amides of unsaturated carboxylic acids may also be used in amounts of up to 5% by weight, based on total monomers, and acrylonitrile may also be used as a comonomer in amounts of up to 25% by weight, based on total monomers.

Under the action of shearing forces, copolymer dispersions of this type thicken abruptly at a certain shearing rate $\gamma_k$—the critical shearing rate, in general in the range from 0.1 to $10^4 s^{-1}$—with the viscosity increasing by at least a factor of 100. This thickening (dilatancy transition) is reversible, ie. when the shearing rate falls below the critical value the polymer dispersion again assumes a low viscosity. In other words, highly dilatant dispersions show, within a narrow range of shearing rates, an increase in viscosity which corresponds to $$\frac{d \ln \eta}{d \ln \gamma} \geq 10$$

with the viscosity increasing, in total, by a factor $f \geq 100$ as the shearing rate $\gamma$ increases. The range of shearing stresses at the critical shearing rates of such dispersions is in general from $10^3$ to $10^6$ Pa.

In such dispersions, the viscosity change and the particular critical shearing rate are highly temperature-dependent, in the sense that the higher the temperature of the dispersion, the higher is the critical shearing rate and the lower is the viscosity change. This behavior is troublesome when such highly dilatant dispersions are employed in, for example, hydraulic clutches or shock absorber fillings, or in the manufacture of rotational speed limiters, since here the abrupt increase in viscosity of the dispersion should have minimal temperature-dependence. The critical shearing rate of such dispersions increases by a factor of 10–100 when the dispersion is heated from, for example, 20° C. to 60° C., and this is also very troublesome for the applications mentioned.

We have found that dispersions of copolymers of from 1 to 10% by weight of $\alpha,\beta$-monoolefinically unsaturated monocarboxylic acids and/or dicarboxylic acids and from 99 to 90% by weight of other olefinally unsaturated monomers, which dispersions have been produced emulsion copolymerization and exhibit highly dilatant flow, show greatly reduced temperature dependence of their critical shearing rate if they contain from 0.1 to 30% by weight, based on the copolymers, of oxides, hydroxides, carbonates and/or water-soluble salts of monovalent or divalent metals. It is particularly advantageous if they contain from 0.5 to 10% by weight, based on the copolymers, of oxides, hydroxides, carbonates and/or water-soluble salts of magnesium, calcium and/or zinc.

Copolymer dispersions with highly dilatant flow can be produced, for example, by the process of U.S. Pat. No. 4,371,636. The copolymers preferably contain from 2 to 10% by weight of the $\alpha,\beta$-monoolefinically unsaturated monocarboxylic acids and/or dicarboxylic acids of 3 to 5 carbon atoms, especially acrylic acid and/or methacrylic acid and/or maleic acid, as copolymerized units. As monoolefinically unsaturated comonomers they preferably contain from 0 to 90% by weight of acrylic acid or methacrylic acid esters of alkanols of 1 to 14 carbon atoms, from 0 to 90% by weight of styrene and/or methyl methacrylate and from 0 to 5% by weight of polyolefinically unsaturated monomers, such as, in particular, butanediol diacrylate, trimethylolpropane triacrylate or divinyl benzene or butadiene, as copolymerized units. These can be entirely or partially replaced by monoolefinically unsaturated monomers having an additional reactive group, such as N-methylolacrylamide, N-methylolmethacrylamide, glycidyl acrylate and glycidyl methacrylate. The composition of the monomers is generally so chosen that the glass transition temperature of the copolymer is above 50° C. and preferably above 75° C. The emulsion copolymerization by which the dispersions are produced is preferably carried out at from 60° to 95° C. in the presence of from 0 to 0.5% by weight of an anionic emulsifier and from 0 to 1% by weight, based on the amount of monomers, of a non-ionic emulsifier.

It is preferred to use dispersions of high dilatancy which contain agglomerated copolymer particles with a very uneven and irregular surface, the particles having been formed, during their preparation by emulsion polymerization, as a result of partial agglomeration of the primary copolymer particles of diameter from 50 to 200 nm. However, to prepare the mixtures according to the invention it is also possible to employ dispersions with highly dilatant flow wherein the copolymers contain COOH groups but which have been prepared in a different manner and have particles of a different shape.

The liquid phase of the copolymer dispersion with highly dilatant flow should, for the use according to the invention, in general contain not less than 10%, and preferably not less than 30%, of water; a water content of from 30 to 70% has proved particularly suitable. In addition, the liquid phase of the copolymer dispersion may, for example, contain glycols, diglycols, triglycols, glycerol and/or formamide.

The content of oxides, hydroxides, carbonates and/or water-soluble salts of monovalent or polyvalent metals should be from 0.1 to 30, preferably from 0.5 to 10, % by weight, based on the amount of copolymer. Suitable metal compounds are, in particular, magnesium oxide and hydroxide, calcium oxide and hydroxide, zinc oxide and hydroxide, magnesium sulfate, magnesium acetate, calcium acetate, zinc ammonium carbonate, zinc acetate, calcium carbonate, lithium acetate, lithium hydroxide, aluminum hydroxide, strontium oxide and hydroxide, barium oxide and hydroxide and chlorides and sulfates of lithium, sodium and potassium. Magnesium hydroxide, calcium hydroxide, zinc oxide and zinc ammonium carbonate have proved particularly suitable.

The dispersions according to the invention, which have highly dilatant flow and contain such metal compounds, are in particular distinguished in that their critical shearing rate in general shows greatly reduced temperature dependence in the range of from $-30°$ to $+80°$ C. and in some cases shows virtually no temperature dependence at all. This is particularly advantageous when such copolymer dispersions according to the invention are used for vibration dampers, rotational speed limiters or hydraulic clutches, especially since in these cases the force which can be transmitted then shows less temperature dependence, or virtually zero temperature dependence, above the critical shearing rate.

It is true that the plurality of literature references disclose that oxides, hydroxides and/or water-soluble salts of monovalent and polyvalent metals of the above-mentioned type may be added to aqueous dispersions of carboxyl-containing copolymers which do not exhibit dilatant flow. These additives in general serve to produce ionic crosslinking of the copolymers during film formation and hence to increase the water resistance of the polymer films or to salt out the polymers. Calcium carbonate, for example, has also been added in large amounts as a filler in the prior art. Finally, oxides of polyvalent metals have already been extensively employed as pigments in paint dispersions. However, it cannot be deduced from this that such compounds greatly influence the temperature dependence of the critical shearing rate of highly dilatant polymer dispersions.

In the examples which follow, parts and percentages are by weight, unless stated otherwise.

I. PREPARATION OF DILATANT DISPERSIONS

Dispersion A 240 parts of water, 70 parts of feed 1 and 10 parts of feed 2 are introduced into a stirred vessel. Feed 1 consists of 400 parts of styrene, 60 parts of ethyl acrylate, 15 parts of acrylic acid, 15 parts of methacrylamide, 10 parts of maleic acid, 5 parts of a 40% strength aqueous solution of a sodium $C_{12}$–$C_{18}$-paraffin sulfonate and 180 parts of water; feed 2 consists of 3.5 parts of potassium peroxydisulfate and 80 parts of water.

The initial charge is heated to 80° C. with stirring, and is kept at this temperature for 20 minutes. The remainder of feeds 1 and 2 is then added at a uniform rate over $2\frac{1}{2}$ hours, while keeping the temperature at about 85° C. Polymerization is then allowed to proceed for a further 3 hours, after which the batch is mixed with 500 parts of water and cooled. The resulting dispersion A has a polymer content of 32.5% and the particles have a rough surface and a diameter of about 600 nm.

After addition of formamide or glycerol respectively, and evaporation of excess water, the comparative dispersions A0 and A7 are obtained.

Dispersion B

The procedure followed is as described for dispersion A, but in feed 1 7.5 parts of the paraffin sulfonate and 10 parts of a 20% strength aqueous solution of an adduct of 25 moles of ethylene oxide with p-isooctylphenol are employed and the time over which the feed is added is increased by $1\frac{1}{2}$ hours. A dispersion B which contains round particles of diameter about 330 nm is obtained. Copolymer powder obtained therefrom by freeze drying can be redispersed easily and completely. Redispersion of 55 parts of the copolymer powder in 45 parts of water gives the 55% strength comparative dispersion B0.

Dispersion C

The procedure followed is as described for dispersion A, except that feed 1 consists of 380 parts of styrene, 90 parts of t-butyl acrylate, 15 parts of acrylic acid, 15 parts of methacrylamide, 3.75 parts of Na $C_{12}$–$C_{18}$-paraffin sulfonate and 180 parts of water.

Dispersion C is obtained, which has a polymer content of 33%, with the polymer particles having a rough surface and a diameter of about 500 nm.

After addition of glycerol thereto, and evaporation of excess water, comparative dispersion C0 is obtained.

Dispersion D

The procedure followed is as described for dispersion A, but an initial charge of 500 parts of water, 0.1 part of sodium ethylenediaminetetraacetate, 170 parts of feed 1 and 21 parts of feed 2 is employed and the mixture is heated to 85° C., with stirring. Feed 1 is an emulsion of 500 parts of water, 960 parts of styrene, 144 parts of acrylonitrile, 36 parts of acrylic acid, 36 parts of methacrylamide, 24 parts of maleic acid and 5 parts of a 40% strength aqueous solution of sodium $C_{12}$–$C_{18}$-paraffin sulfonate. Feed 2 is a solution of 8 parts of sodium peroxydisulfate in 200 parts of water. 30 minutes after 85° C. has been reached, the remainders of feeds 1 and 2 are added at a uniform rate over 3 hours, and polymerization is then allowed to go to completion over a further 3 hours at 85° C. The resulting dispersion has a polymer content of 47.5% and its particles have a diameter of about 750 nm and a rough surface.

After addition of glycerol to this dispersion, and evaporation of excess water, comparative dispersion D0 is obtained.

II. PREPARATION OF THE HIGHLY DILATANT DISPERSIONS HAVING A CRITICAL SHEARING RATE WHICH IS ONLY SLIGHTLY TEMPERATURE-DEPENDENT $C_x$ and $D_x$ obtained have the critical shearing rates shown for various temperatures in the Table.

The same results are also obtained if, in the preparation of the mixture, the water is first evaporated from dispersions A, B, C and D, for example under reduced pressure, the resulting powder residue is redispersed in the solvent shown in the Table, and the metal compounds are then added. Evaporation of the water can also be effected by, for example, spray drying or freeze drying.

TABLE

| Example No. | Dispersants | Solids content % | Additive | Critical shearing rate at 20° C. $\dot{\gamma}_k$, 20° C. [s$^{-1}$] | $F = \dfrac{\dot{\gamma}_k(T1)}{\dot{\gamma}_k(T2)}$ T1 > T2 (in °C.) F | T1 | T2 |
|---|---|---|---|---|---|---|---|
| Comparative dispersion |  |  |  |  |  |  |  |
| A0 | Formamide/water 1:1 | 55 | — | 10 | 66<br>8 | +20<br>+55 | −30<br>+20 |
| A1 | Formamide/water 1:1 | 55 | 1.5% Ca(OH)$_2$ | 10 | 5<br>0.25 | +20<br>+55 | −30<br>+20 |
| A2 | Formamide/water 1:1 | 55 | 6.4% Ba(OH)$_2$.8 H$_2$O | 15 | 5<br>1.3 | +20<br>+55 | −30<br>+20 |
| A3 | Formamide/water 1:1 | 55 | 5.4% Sr(OH)$_2$.8H$_2$O | 8.5 | 2.8<br>0.3 | +20<br>+55 | −30<br>+20 |
| A4 | Formamide/water 1:1 | 55 | 0.5% ZnO | 4 | 2<br>1.25 | +20<br>+55 | −30<br>+20 |
| A5 | Formamide/water 1:1 | 53 | 1% Zn acetate | 34 | 6.8<br>1.9 | +20<br>+55 | −30<br>+20 |
| A6 | Formamide/water 1:1 | 53 | 1% Zn sulfate | 20 | 8<br>3.4 | +20<br>+55 | −30<br>+20 |
| Comparative dispersion |  |  |  |  |  |  |  |
| A7 | Glycerol/water 1:1 | 52 | — | 30 | 30<br>17 | +20<br>+60 | −15<br>+20 |
| A8 | Glycerol/water 1:1 | 52 | 5.4% Sr(OH)$_2$.8 H$_2$O | 2.5 | 17<br>1.6 | +20<br>+60 | −15<br>+20 |
| A9 | Glycerol/water 1:1 | 50.5 | 8% Ba(OH)$_2$.8 H$_2$O | 3 | 10<br>2.3 | +20<br>+60 | −15<br>+20 |
| A10 | Glycerol/water 1:1 | 50.1 | 2% Ca(OH)$_2$ | 19 | 12.7<br>0.5 | +20<br>+60 | −15<br>+20 |
| Comparative dispersion |  |  |  |  |  |  |  |
| A11 | Water | 50 | — | 3950 | 20 | +60 | +20 |
| A12 | Water | 50 | 10% LiCl | 95 | 1.1 | +60 | +20 |
| A13 | Water | 50 | 10% NaCl | 40 | 2.5 | +60 | +20 |
| A14 | Water | 50 | 10% KCl | 40 | 2.5 | +60 | +20 |
| A15 | Water | 50 | 10% MgCl$_2$ | 25 | 0.5 | +60 | +20 |
| A16 | Water | 50 | 1% Ni(OH)$_2$ | 200 | 3.0 | +60 | +20 |
| A17 | Water | 50 | 1% SnO$_2$ | 250 | 1.8 | +60 | +20 |
| Comparative dispersion |  |  |  |  |  |  |  |
| B0 | Water | 55 | — | 110 | 5.2<br>2.9 | +20<br>+40 | ±0<br>+20 |
| B1 | Water | 55 | 1.5% Ca(OH)$_2$ | 540 | 1.7<br>1.4 | +20<br>+40 | ±0<br>+20 |
| Comparative dispersion |  |  |  |  |  |  |  |
| C0 | Glycerol/water 1:1 | 50 | — | 15 | 11 | +50 | +20 |
| C1 | Glycerol/water 1:1 | 50 | 1.25 Ca(OH)$_2$ | 11 | 1.0 | +50 | +20 |
| C3 | Ethylene glycol/water 1:1 | 50 | 0.85 Ca(OH)$_2$ | 12 | 1.5 | +50 | +20 |
| Comparative dispersion |  |  |  |  |  |  |  |
| D0 | Glycerol/water 1:1 | 48 | — | 10 | 38 | +50 | +20 |
| D1 | Glycerol/water 1:1 | 48 | 1.5% Ca(OH)$_2$ | 8 | 1.4 | +50 | +20 |

The metal compounds shown in the Table are added to dispersions A, B, C and D, together with any additional solvents shown in the Table, and the solids content is adjusted to the value in the Table by evaporation of water under reduced pressure. The mixtures $A_x$, $B_x$, $C_x$ and $D_x$ obtained have the critical shearing rates

We claim:

1. A dispersion, prepared by emulsion copolymerization and having highly dilatant flow, of a copolymer of from 1 to 10% by weight of α,β-monoolefinically unsaturated monocarboxylic acids and/or dicarboxylic acids and from 99 to 90% by weight of other olefinically unsaturated monomers, which dispersion contains from 0.1 to 30% by weight, based on copolymer, of oxides, hydroxides, carbonates and/or water-soluble salts of monovalent or divalent metals and which shows, within a range of shearing stresses of from $10^3$ to $10^6$ Pa at the critical shearing rates of such dispersions, an increase in viscosity corresponding to the equation $$\frac{d \ln \eta}{d \ln \gamma} \geqq 10$$

with the viscosity increasing by at least a factor of 100.

2. A dispersion as claimed in claim 1, which contains from 0.5 to 10% by weight of oxides, hydroxides, carbonates and/or water-soluble salts of magnesium, calcium and/or zinc.

* * * * *